Sept. 13, 1960 TAKESHI GOSHIMA 2,952,196
REFLEX MIRROR OPERATING MECHANISM FOR PHOTOGRAPHIC CAMERAS
Filed Jan. 3, 1957 2 Sheets-Sheet 1

INVENTOR.
TAKESHI GOSHIMA
BY
ATTORNEY

Sept. 13, 1960   TAKESHI GOSHIMA   2,952,196
REFLEX MIRROR OPERATING MECHANISM FOR PHOTOGRAPHIC CAMERAS
Filed Jan. 3, 1957   2 Sheets-Sheet 2
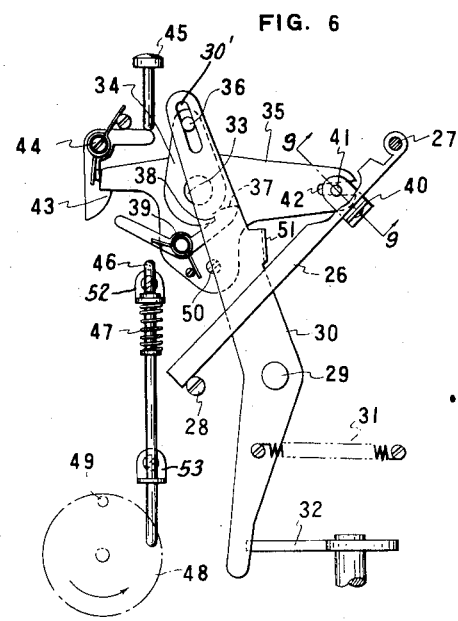
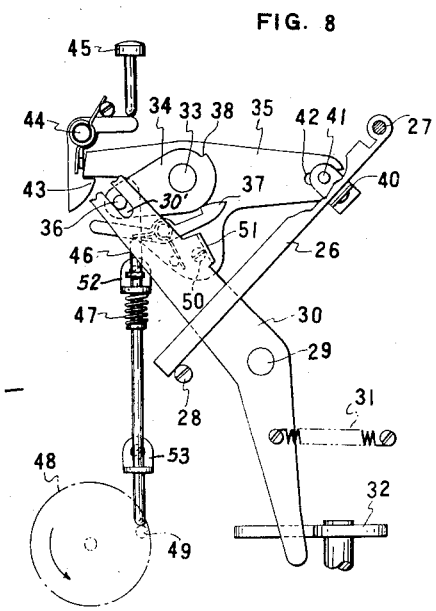
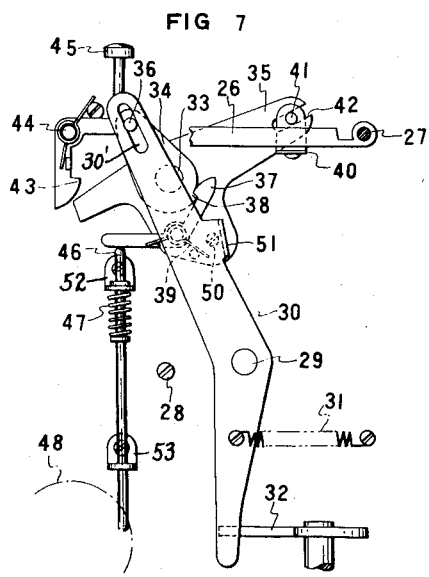
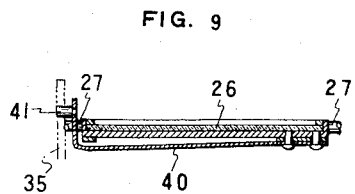
INVENTOR.
TAKESHI GOSHIMA
BY
ATTORNEY

United States Patent Office 2,952,196
Patented Sept. 13, 1960

2,952,196

REFLEX MIRROR OPERATING MECHANISM FOR PHOTOGRAPHIC CAMERAS

Takeshi Goshima, Tokyo, Japan, assignor to Canon Camera Company, Inc., Tokyo, Japan, a corporation of Japan Filed Jan. 3, 1957, Ser. No. 632,291

Claims priority, application Japan June 26, 1956

5 Claims. (Cl. 95—42)

The instant invention relates to photographic cameras, and more particularly to reflex mirror operating mechanisms of single objective reflex cameras.

An object of the instant invention is to obtain a promptly operating reflex mirror and particularly to improve its quick return movement.

Another object is to obtain an improved reflex mirror operating mechanism executing most exact and accurate mirror movement.

A further object of the present invention is to provide a simple reflex mirror operating mechanism in which the energy stored in the driving spring thereof is expended and utilized with a minimum of loss.

Prior known reflex mirror operating mechanisms of the instant type of cameras are provided with two springs, one for swinging the reflex mirror into its withdrawn or raised position and the other for reverting the mirror to its interposed or viewing position, with the springs working in opposition, or counter, to each other resulting in wasted energy; that is, the photographer encounters a good deal of resistance when he tensions the mirror operating mechanism. In consequence of the mutual opposition of the springs, the spring for swinging the mirror upwardly will be a powerful spring and cause much jerking of the camera on operation.

The reflex mirror operating mechanism according to the invention comprises two latching means coupled to a reflex mirror tension lever system and operating in succession so that when the first latching means is released, the mirror swings to its withdrawn position as soon as the second latching means is released by pressing down the exposure button, is maintained so withdrawn during the exposure, and is restored to its initial interposed position simultaneously with the termination of the running down of the second curtain of the shutter.

The objects, advantages and structure of the instant invention will become apparent from the description hereinafter following and the drawing forming a part hereof, in which:

Figs. 1 through 5 illustrate a first practical embodiment of a reflex mirror operating mechanism for photographic cameras according to the instant invention and Figs. 6 through 9 illustrate another embodiment of the reflex mirror operating mechanism of the invention, of which:

Fig. 1 is a side view of the mechanism of the first embodiment with the mirror driving spring tensioned;

Fig. 2 is a side view when the reflex mirror is swung up, that is, the first latching member disengaged from its engaging member;

Fig. 3 is a side view before the reflex mirror driving spring is tensioned, that is, in the mirror rest position;

Fig. 4 is a longitudinal section in the direction of the arrow on line 4—4 in Fig. 1;

Fig. 5 is a plan view of the tensioning cam of the mirror driving spring;

Fig. 6 is a side elevation to illustrate the mechanism of the second embodiment with the mirror driving spring tensioned;

Fig. 7 is a side elevation to illustrate the condition when the reflex mirror thereof is swung up;

Fig. 8 is a side elevation to illustrate the condition before the reflex mirror driving spring is tensioned, that is, in the mirror rest position; and Fig. 9 is a longitudinal section in the direction of the arrow on line 9—9 in Fig. 6.

Figure 1:
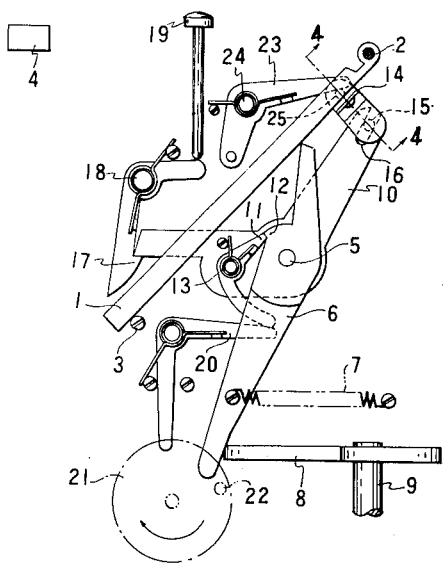
Figure 2:
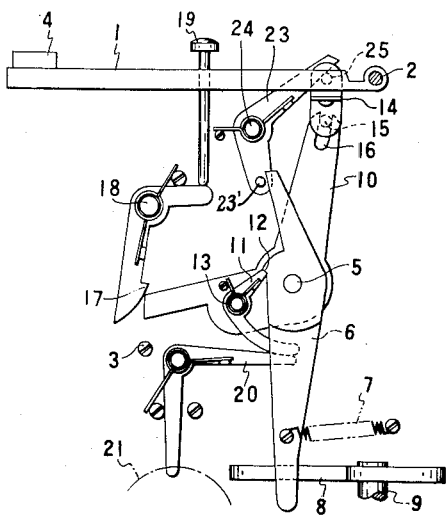

Referring to the drawing, and more particularly to the first illustrative embodiment of the reflex mirror operating mechanism of the invention shown in Figs. 1 through 5, 1 is a reflex mirror and 2 is the pivot shaft for reflex mirror 1, which shaft is affixed to the camera housing. It will be noted that the first illustrative embodiment, as also the second below discussed, is of the type for a focal plane shutter camera, the focal plane shutter having a first shutter curtain and a second shutter curtain of the well known type. 3 is the stop member for mirror 1 at its swung down or rest position, while 4 is a stop for mirror 1 at its swung up position. 5 is a stub shaft rigidly affixed to the camera housing on which stub shaft a tension lever 6 is pivoted. A tension spring 7 is tensioned between one arm of lever 6 and the camera casing. A cam 8 provided at the upper end region of shaft 9 engages with the lower end region of lever 6. The shaft 9 of cam 8 is coupled with the shutter curtain winding mechanism to rotate cam 8 in operative connection with the lower end region of lever 6 when the shutter curtain is wound up. A single rotation of cam 8 swings tension lever 6, in engagement with the cam nose periphery, outwardly and the spring 7 is tensioned to bias lever 6 with a restoring force. A coupling lever 10 is also pivoted on shaft 5 and a falciformed latching member 11 is pivoted on pin 13 on coupling lever 10. To couple tension lever 6 and coupling lever 10 a dog 12 is integrally formed on lever 6, the latching member 11 being brought into engagement with dog 12 by a clockwise biasing, coiled spring about pin 13 to drive coupling lever 10 when lever 6 is tensioned. Coupling lever 10 and latching member 11 function as the aforementioned first latching means for lever 6 when the latter is tensioned. The upper end 16 of coupling lever 10 is fork shaped for coupling to reflex mirror 1 and swings the mirror to the swung up position, as illustrated in Fig. 2, when forked end 16 turns counterclockwise. To engage coupling lever 10 with reflex mirror 1, the coupling lever may directly be connected thereto, but in this embodiment as shown in the drawing, a pin 15 is attached to the free end of a plate spring 14 provided at the back of the reflex mirror, and the latching engagement of pin 15 with forked end 16 of coupling lever 10 operates the reflex mirror 1 indirectly. 17 is a pawl of bell crank shape pivoted at pin 18, and spring biased counterclockwise by a coiled spring about such pin to engage with the other end of coupling lever 10 when lever 6 is tensioned, and releases such other end of coupling lever 10 from engagement with its hooked end when pressing down on shutter release button 19 which rotates pawl 17 clockwise against the spring bias sufficiently to release such other end of lever 10. 20 is a coupling bell crank spring biased clockwise pivoted on the camera housing in latching engagement with latching member 11 and projects its other arm into the path of a pin 22 provided on a rotatable disk 21 connected with the driving or winding shaft for the second curtain of the shutter. When the camera shutter is actuated to make an exposure and the second curtain is closed, latching member 11 is rotated counter-clockwise on its pivot pin 13 by bell crank 20 and pin 22 to release latching member 11 from its engagement with dog 12. An intermediate lever 23 is biased by a coil spring about a pivot shaft 24 fixed to the camera body and is actuated by lever 6 after dog 12 is disengaged from latching member 11. As is clear from Figures 1 through 3 the spring bias of its coil spring tends to rotate lever 23 clockwise. Intermediate lever 23 pivots the free end of mirror 1 downwardly after the second latching means disengages. To this end a pin 23' projects from one end of intermediate lever 23 into the path of, and to engage with, the upper end of tension lever 6 while the other end of lever 23 engages a pin 25 on the plate spring 14 at the back of the mirror 1. It should be noted that the camera shutter is so designed that it initiates motion when reflex mirror 1 is swung up by providing a positive coupling between them.

Figure 3:
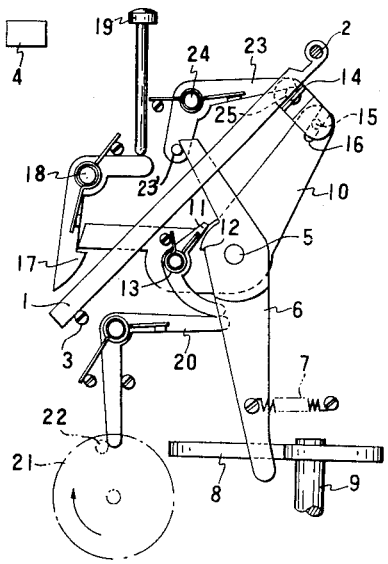
Figure 4:
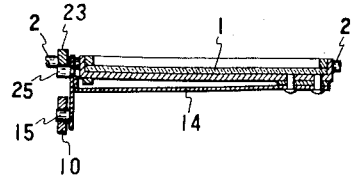
Figure 5:
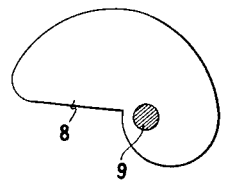

In a photographic camera incorporating the mechanism according to the aforesaid embodiment, cam 8 makes one revolution with shaft 9 when the shutter curtain is wound up and lever 6 is rotated clockwise thereby from the position shown in Figure 3 to that shown in Figure 1. Such rotation of tension lever 6 extends tension spring 7, and when spring 7 is fully extended dog 12 is engaged by latching member 11. Cam 8 having made one complete revolution is clear of the path of the lower end of lever 6 to enable actuation of the lever, such lower end of the lever being against the flat trailing portion of the cam nose which is substantially radial from substantially the largest cam radius to the smallest cam radius. Tension lever 6, and with it coupling lever 10, are now under the full tension of spring 7 and retained in such position by pawl 17 as shown in Figure 1. When the shutter release button 19 is now depressed, pawl 17 releases lever 10 which turns counterclockwise with tensioned lever 6 as a unit under the pull of spring 7 and, as a result, reflex mirror 1 swings counterclockwise and up, and coupling lever 10 as well as tension lever 6 remain in their swung up positions for a moment. The aforesaid explanation clarifies the performance of the first latching means. When reflex mirror 1 swings up, the shutter curtains operate successively, the mirror in so doing releasing the shutter release member directly or indirectly. Towards the termination of the second shutter curtain movement, pin 22 provided on rotating disk 21 pushes coupling bell crank 20 to release latching member 11 from dog 12 so the lever 6 is likewise released from coupling lever 10 to permit lever 6 to pivot still further. When latching member 11 disengages from dog 12, lever 6 pivots still further under the tension of spring 7 so that its upper end engages with projection 23' of intermediate lever 23 and lever 23 swings clockwise, eventually to swing reflex mirror down to its original rest or interposed position by means of a pin 25, as illustrated in Fig. 3. It should be noted that the motion by which mirror 1 is swung down from its withdrawn position is also effected by the same spring, namely spring 7, attached to tension lever 6. The reflex mirror 1 maintains its position resting against stop 3 by the tension of spring 7 even at its swung down position by virtue of plate springs 14, intermediate lever 23 and lever 6. Plate spring 14 has one end affixed to the reflex mirror, or to the supporting frame of the mirror, as shown in Fig. 4, and is so prebiased that its free (left) end is spaced from the mirror and, due to its springiness, flexible relative thereto. The free end of the plate spring 14 carries an ear extending substantially normal from both sides thereof, and pins 15 and 25 extend from the ear substantially parallel to spring 14. Therefore, plate spring 14 produces a sufficient biasing force even in the position shown in Figure 3 to maintain the mirror accurately in the lowered position without even the slightest gap relative to stop 3. Its action is quite important. While coupling lever 10 is engaged by pawl 17, forked end 16 of lever 10 imparts bias to plate spring 14, and the mirror is pressed against stop 3. Thus plate spring 14 effectively performs its function of keeping reflex mirror 1 at a predetermined precise position on stop 3 at all times whether spring 7 is tensioned or not.

In the second illustrative embodiment of the invention shown in Figures 6 through 9, reflex mirror 26 is swingably supported on shaft 27 affixed to the camera body. 28 is a stop for reflex mirror 26 at its swung down, rest or interposed, position, and 29 a stub shaft affixed to the camera housing on which is pivoted a tensioning lever 30. A tension spring 31 is tensioned between tension lever 30 and the camera housing. 32 is a cam, like cam 8 of the first embodiment, engaging the lower end of tension lever 30 to swing the latter clockwise while simultaneously tensioning spring 31 as the camera shutter is wound up. The upper end of tension lever 30 has an elongated aperture 30' into which projects a pin 36 provided at the outer end of a coupling arm 34 pivoted on a stub shaft 33 affixed to the camera casing. A coupling lever 35 is also pivoted to shaft 33 and has a pawl or latch member 37 pivoted thereon and biased by a coil spring 39 about its pivot pin. A dog 38 is formed on coupling arm 34 to engage pawl 37. When lever 30 is tensioned, like lever 6 of the first illustrative embodiment, pawl 37 engages with dog 38 under the action of spring 39 and then cam 32 is out of the path of the lower end of tension lever 30 since cam 32 has completed exactly a whole revolution with the winding of the camera shutter for the next exposure. Thus coupling arm 34 functions as the first latching mechanism to hold lever 30 when lever 30 is tensioned by cam 32. A forked end 42 of coupling lever 35 engages a pin 41, projecting from the free end of plate spring 40 affixed to the back of the mirror similar to pin 15 or 25 of the first embodiment (Fig. 4). The reflex mirror 26 is moved to its swung up or withdrawn position by means of pin 41 and forked end 42 of the coupling lever 35 when coupling lever 35 turns counterclockwise on disengaging a pivoted pawl 43 therefrom by depressing camera release button 45, as illustrated in Figure 7. A rotatable disk 48 is provided at the lower portion of the camera and has a projection 49 thereon, the disk making one whole revolution when the second curtain of the shutter runs down in making the exposure. A vertically slidable rod 46 is mounted in bearings 52, 53 secured to the camera body. A spring 47 is inserted about the upper end of rod 47 between a shoulder on the rod and the lower surface of upper bearing 52 so as to provide some clearance between pawl 37 and the upper end of the rod except when the projection 49 moves the rod upwardly when it engages with the bottom of the rod at the terminal portion of the rotation of disk 48.

When the second shutter curtain is closed after an exposure has been made, pin 49 on rotatable disk 48 kicks up the lower end of slidable rod as illustrated in Fig. 8 to disengage pawl 37 from dog 38. In this embodiment, a pin 50 is provided on the other arm of coupling lever 35 to engage with an upturned end 51 formed on tension lever 30. As the tension lever 30 turns counterclockwise, upturned end 51 presses against pin 50 and swings coupling lever 35 clockwise about pivot 33 to revert the reflex mirror to its swung down or rest, initial position from its swung up position by the pull of tension spring 31.

The operation of a photographic camera with the mechanism according to the second illustrative embodiment is as follows: when the shutter curtain is first wound up the tension lever is pivoted clockwise by the action of cam 32 which is on a shaft coupled with the shutter curtain winding mechanism and simultaneously spring 31 is tensioned. At the same time, coupling arm 34 rotates from the original position illustrated in Fig. 8 to the position shown in Fig. 6, by means of the interconnection between elongated aperture or slot 30' and pin 36, to engage dog 38 with pawl 37. After the high nose or lift of cam 32 swings beyond tension lever 30, lever 30 is maintained under tension by means of the second latching mechanism including latch member 37 and dog 38. When shutter release button 45 is depressed to make an exposure, pawl 43 releases coupling lever 35 and coupling lever 35, in association with coupling arm 34, rotates counterclockwise by means of dog 38 and pawl 37 thus to force reflex mirror 26 to the swung up or withdrawn position. This movement is the operation of the first latching mechanism of tension lever 30. When reflex mirror 26 swings up, mirror 26 releases a latch (not shown) for the shutter curtain, and the shutter makes an exposure. Such interconnection between the mirror and the shutter release mechanism is well known to workers in this art, and hence is not shown or described. Towards the closure of the second curtain, pin 49 on rotating disk 48 kicks slidable rod 46 up to release pawl 37 from dog 38 to permit tension lever 30 to turn still further in the counterclockwise direction. Hence the release of the second latching mechanism of the tension lever pushes pin 50 by upturned end 51 of tension lever 30 so that coupling lever 35 turns clockwise to revert reflex mirror 26 to the swung down or rest position.

It should be noted that conventional reflex mirror operating mechanisms of cameras provide merely a swing up means, including a tension spring, for the reflex mirror. It is usual to provide an independent return spring to meet the desired function of swinging the reflex mirror down. These two different springs with their fundamentally oppositely directed pulls, to some extent cancel each other's effect in that the upswinging motion is retarded by the spring for the down-swinging motion, and vice versa. Obviously such operation is not very desirable and results in wasted energy. On the contrary the reflex mirror operating mechanism according to this invention provides for utilization of but one spring in common for the different purposes of swinging the reflex mirror up and swinging it down, in reasonably satisfactory manner without such objectionable return spring so that there remains no cause to worry about such objections. With the reflex mirror operating mechanism of the invention, there is no diminution or impairment of the natural function of a tension spring and the pull of the spring is utilized most efficiently both for swinging the reflex mirror up and for swinging it down, thus improving the speed of swinging and attaining a fast return motion of the reflex mirror after an exposure.

What I claim is:

1. A reflex mirror operating mechanism for photographic cameras having a shutter and means for releasing the shutter to make an exposure comprising a mirror swingable about a horizontal shaft between a first intercepting position and a second withdrawn position, a plate spring secured to the reflex mirror at one end region thereof, a projection integral with the free end of the plate spring, a coupling lever swingably mounted on the camera housing, one arm of the coupling lever having a forked end engaging the projection, a spring biased angle lever, one arm of the angle lever being coupled to the release means of the camera shutter, the other arm of each the angle lever and the coupling lever constituting a first latching means which is engaged when the mirror is in the intercepting position, a cam rotatable one turn when winding the camera shutter in the tensioning direction, a tension lever swingably mounted at its intermediate region on the camera housing, one arm of the tension lever extending into the path of the cam, a tension spring interconnecting such one arm of the tension lever and the camera housing and adapted to be tensioned by rotation of the cam in the shutter tensioning direction, an intermediate coupling mechanism connecting the tension lever and the coupling lever, a rotatable disk which rotates somewhat less than a whole turn when the camera shutter is released to make an exposure, a projection on the disk, and a spring biased mechanism interconnecting the projection on the disk with the intermediate coupling mechanism on closure of the shutter, the arm of the spring biased angle lever releasing the arm of the coupling lever engaged thereto during the initial exposure movement of the shutter release means whereupon the tension spring moves the tension lever and the coupling lever in unison, the cam having rotated a complete turn so that it permitted free movement of the one arm of the tension lever extending into its path, to move the mirror to its withdrawn position for the period of the exposure, the movement of the projection on the disk actuates the spring biased mechanism to permit the tension lever to continue moving in the same direction under the pull of the tension spring to restore the mirror to its intercepting position.

2. A reflex mirror operating mechanism according to claim 1 in which the plate spring is so secured to the mirror at one end region only to allow elastic movement of its other end region relative to the mirror.

3. A mirror operating mechanism for reflex photographic cameras having a shutter winding means and a curtain shutter comprising a horizontal shaft, a reflex mirror swingable about the horizontal shaft to occupy one position selectively of a light intercepting position and a withdrawn position, a plate spring affixed to the back of the mirror having a free end and substantially parallel to the horizontal shaft, a projection at the free end of the plate spring, a stop on the camera body to determine the light intercepting position of the mirror, a coupling lever pivotally mounted on the camera body of which one arm having a forked end engages the plate spring projection, a first spring-biased latching means, the other arm of the coupling lever selectively engaging the first latching means, a shutter release means coupled to the first latching means to disengage such other arm of the coupling lever during the initial portion of the exposure movement of the shutter release means, a cam rotatable one complete turn on operating the shutter winding means to tension the shutter, a tension lever pivotally mounted at an intermediate portion of the tension lever on the camera body of which lever one arm extends into the path of the cam, a tensioning spring connected to the tension lever, a rotatable disk which rotates somewhat less than a whole turn when the camera shutter is closed, a projection on the disk, a second latching mechanism selectively connecting the tension lever to the coupling lever, and an intermediate member between the second latching mechanism and the projection on the disk to release the second latching mechanism at the termination of the exposure movement of the shutter, operation of the shutter winding means in the shutter tensioning direction rotating the cam to tension the tensioning spring to a maximum and positioning the cam so that the tension lever may freely move under the pull of the tensioning spring, such movement being prevented by the engagement of the first latching means with said other arm of the coupling lever until the shutter release means is depressed and releases said first latching means and said coupling lever arm whereupon the reflex mirror is swung to its withdrawn position by the tensioning spring, the tension lever, the latched second latching mechanism and the plate spring, the mirror in its withdrawn position releasing the shutter curtains to make an exposure, which exposure operation rotates the disk finally to release the second latching means and thereby the other arm of the tension lever swings the reflex mirror from its withdrawn to its intercepting position under the pull of the tensioning spring through the plate spring projection.

4. A mirror operating mechanism for reflex photographic cameras having a curtain shutter, shutter tensioning means and shutter release means, comprising a horizontal shaft, a reflex mirror swingable about the horizontal shaft selectively to a light intercepting position and to a withdrawn position, a plate spring attached to the mirror having a free end and substantially parallel to the horizontal shaft, a projection from the free end of the plate spring, a stop projecting from the camera body to engage the free end of the mirror in its light intercepting position, a cam rotatable one complete turn on operation of the curtain tensioning means to tension the shutter, a coupling lever swingably mounted on a pivot on the camera body and having a first arm with a forked end engaging the projection and a second arm, a first spring-biased latching member pivotally mounted on the camera body and engageable to the second arm, the first latching means being coupled to the shutter release means so that on initiation of exposure movement by actuation of the shutter release means the first latching member disengages from the second arm, an intermediate spring-biased two-armed lever pivotally mounted on the camera body, a projection extending from the mirror engaged by one arm of the intermediate two-armed lever, a tension lever mounted on the pivot on which the coupling lever is mounted of which one arm extends into the path of the rotatable cam and is deflectable thereby, a tensioning spring connected from the tension lever to a region of the camera body so that on rotation of the cam on actuation of the shutter tensioning means to tension the shutter the deflection of the one arm of the tension lever tensions the tensioning spring to a maximum, a shoulder in a peripheral portion of the tension lever, a second spring-pressed latching member pivotally supported on the coupling lever and engaging the shoulder for all deflections of the one arm of the tension lever in excess of a predetermined deflection thereof, a rotatable disk which rotates less than one complete turn when the shutter closes to complete an exposure, a projection from the disk, and a spring biased angle lever pivoted on the camera body of which one arm is in the rotary path of the projection from the disk and its other arm biased to engage the second latching member to hold the second latching member in engagement with the shoulder while the tensioning spring is tensioned and to disengage the second latching member from the shoulder when the projection from the disk in its rotation engages such one arm of the spring-biased angle lever to move such lever, the reflex mirror being retained in its intercepting position as the tensioning spring is tensioned from a minimum to a maximum during which the first latching member is latched to the second arm of the coupling lever, being moved to and maintained in its withdrawn position on disengagement of the first latching member from the second arm and the tensioning spring moving the tension lever to engage an arm thereof to the other arm of the intermediate two-armed lever and moving the latter to the extent permitted by the pivotable second latching member in engagement with the shoulder, and being restored to its intercepting position under the pull of the tensioning spring when the movement of the angle lever by the projection from the disk disengages the second latching member from the shoulder.

5. A mirror operating mechanism for reflex photographic cameras having a curtain shutter, shutter tensioning means and shutter release means, comprising a shaft, a reflex mirror swingable about the shaft selectively to a light intercepting position and to a withdrawn position, a plate spring attached to the mirror having a free end and substantially parallel to the shaft, a projection from the free end of the plate spring, a stop projecting from the camera body to engage the free end region of the mirror in its light intercepting position, a cam rotatable one complete turn on operation of the curtain tensioning means to tension the shutter, a coupling lever swingably mounted on a pivot extending from the camera body and having a first arm with a forked end engaging the projection at the free-end of the plate spring and a second arm, a first spring-biased latching member pivotally mounted on the camera body and engageable to the second arm, the first latching member being coupled to the shutter release means so that on initiation of exposure movement of the shutter by actuation of the shutter release means the first latching member disengages from the second arm, a coupling arm swingably mounted on the pivot for the coupling lever, a projection at the free end of the coupling arm, a tension lever swingably pivoted at an intermediate region to the camera body of which one arm extends into the path of the rotatable cam and its other arm defines an elongated aperture into which the projection at the free end of the coupling arm extends, a tensioning spring interconnecting the tension lever and the camera body so that on rotation of the cam on actuation of the shutter tensioning means to tension the shutter the deflection of the one arm of the tension lever tensions the tensioning spring to a maximum, a projection on the coupling lever, an upturned lug on the other arm of the tension lever engaging the projection on the coupling lever when the tensioning spring is at minimum tension to press the mirror resiliently against the stop, a second spring-pressed latching member pivotally mounted on the coupling lever, a shoulder in the peripheral portion of the coupling arm engageable by the second latching member for all deflections of the one arm of the tension lever in excess of a predetermined deflection thereof, a rotatable disk which rotates less than a complete turn when the shutter closes on completion of an exposure, a projection extending from the disk, and a spring biased vertical rod interconnecting the second latching member and the projection extending from the disk to disengage the second latching member from the shoulder under the action of the movement of the rod on engagement of the projection extending from the disk with the rod, the reflex mirror being resiliently retained in the intercepting position during the tensioning of the tensioning spring from the minimum tension to a maximum tension during which the first latching member is latched to the second arm of the coupling lever and the second latching member is engaged to the shoulder by the tension lever deflection due to the rotation of the cam and the interconnection between the tension lever and the tension arm by way of the elongated aperture and the projection at the free end of the coupling arm, being moved to and maintained in its withdrawn position on the disengagement of the first latching member from such second arm by the shutter release means and under the pull of the tensioning spring, and being returned to its intercepting position under the pull of the tensioning spring when the movement of the spring-pressed rod by the projection extending from the disk disengages the second latching member from the shoulder.

References Cited in the file of this patent

UNITED STATES PATENTS 2,579,247     Angenieux _____ Dec. 18, 1951

FOREIGN PATENTS 726,693     Germany _____ Oct. 19, 1942